US012619969B2

(12) United States Patent
Fuks et al.

(10) Patent No.: US 12,619,969 B2
(45) Date of Patent: May 5, 2026

(54) COMPUTERIZED SYSTEMS AND METHODS FOR DYNAMICALLY PROCESSING PAYMENTS ASSOCIATED WITH A MULTI-DISPLAY POS DEVICE

(71) Applicant: COUPANG CORP., Seoul (KR)

(72) Inventors: Pavel Fuks, Seoul (KR); Yimin Sang, Shanghai (CN); Li Cheng, Shanghai (CN); Mingzhu Gu, Shanghai (CN); Ziliang Mao, Shanghai (CN)

(73) Assignee: Coupang Corp., Seoul (KR)

( * ) Notice: Subject to any disclaimer, the term of this patent is extended or adjusted under 35 U.S.C. 154(b) by 139 days.

(21) Appl. No.: 18/229,252

(22) Filed: Aug. 2, 2023

(65) Prior Publication Data

US 2024/0330889 A1      Oct. 3, 2024

Related U.S. Application Data

(63) Continuation-in-part of application No. 18/194,830, filed on Apr. 3, 2023.

(51) Int. Cl.
*G06Q 20/00*          (2012.01)
*G06Q 20/20*          (2012.01)
(Continued)

(52) U.S. Cl.
CPC .......... *G06Q 20/202* (2013.01); *G06Q 20/34* (2013.01); *G06Q 20/40145* (2013.01)

(58) Field of Classification Search
CPC ................. G06Q 20/202; G06Q 20/34; G06Q 20/40145; G06Q 20/20; G07G 1/0018; G07G 1/0036
See application file for complete search history.

(56) References Cited

U.S. PATENT DOCUMENTS

| | | | | |
|---|---|---|---|---|
| 10,504,092 B2 * | 12/2019 | Bell | ...................... | G06F 3/0481 |
| 10,956,887 B2 * | 3/2021 | Vick | ................... | G06Q 20/325 |

(Continued)

FOREIGN PATENT DOCUMENTS

| | | |
|---|---|---|
| KR | 10-2022-0008625 A | 1/2022 |
| TW | 201843638 A | 12/2018 |
| WO | WO-2020/132476 A1 | 6/2020 |

OTHER PUBLICATIONS

Office Action and search report for counterpart R.O.C. Application No. 112146960, dated Jan. 15, 2025, with translation, 25 pages.

(Continued)

*Primary Examiner* — Rokib Masud

(74) *Attorney, Agent, or Firm* — FINNEGAN, HENDERSON, FARABOW, GARRETT & DUNNER, LLP

(57) ABSTRACT

Computer-implemented systems and methods for dynamically controlling a multi-display device such as a point-of-sale (POS) device are disclosed and may be configured to receive a first input; in response to receiving the first input, enable a first input mode by replacing one or more first input elements with one or more second input elements for display on at least one of a first touch display or a second touch display; receive a second input associated with at least one of the first touch display or the second touch display; determine whether the first input mode is enabled; and based on determining whether the first input mode is enabled, deny the second input.

18 Claims, 8 Drawing Sheets

300a

(51) Int. Cl.
    *G06Q 20/34*          (2012.01)
    *G06Q 20/40*          (2012.01)

(56)             References Cited

U.S. PATENT DOCUMENTS

| | | | |
|---|---|---|---|
| 11,334,861 B2 * | 5/2022 | Sanchez-Llorens | ..... G07G 1/01 |
| 2008/0228566 A1 * | 9/2008 | Williams | ........... G06Q 30/0238 |
| | | | 705/14.39 |
| 2020/0184441 A1 | 6/2020 | Johnson et al. | |

OTHER PUBLICATIONS

International Search Report and Written Opinion in counterpart PCT Application No. PCT/IB2023/061579 dated Feb. 19, 2024, (11 pages).
Notice of Preliminary Rejection issued by the Korean Patent Office in counterpart Korean Application No. 10-2023-0169684 dated Sep. 25, 2025 (14 pages).

* cited by examiner

100

200

Receiving a first input via the first touch display — 202

Enabling a first input mode — 204

Receiving a second input associated with at least one of the first touch display or the second touch display — 206

Determining whether the first input mode is enabled — 208

Based on determining whether the first input mode is enabled, denying the second input — 210

COMPUTERIZED SYSTEMS AND METHODS FOR DYNAMICALLY PROCESSING PAYMENTS ASSOCIATED WITH A MULTI-DISPLAY POS DEVICE

RELATED APPLICATIONS

This application is a continuation-in-part of U.S. patent application Ser. No. 18/194,830, filed on Apr. 3, 2023. The contents of the parent application are herein incorporated by reference in their entirety.

TECHNICAL FIELD

The present disclosure generally relates to computerized systems and methods for dynamically processing payments associated with a multi-display device such as a point-of-sale (POS) device. In particular, some embodiments of the present disclosure relate to inventive and unconventional systems for dynamically processing multiple payments received from multiple displays of a multi-display POS device, resulting in a system capable of processing multiple payments received from multiple touch screens being used at the same time using only a single computer.

BACKGROUND

Point-of-sale (POS) technology enables customers to place orders and enables merchants to accept orders. For example, a POS device may display several options that may be selectable via touch inputs and/or inputs received from one or more input/output (I/O) devices, such as a keyboard or pointing device, connected to the POS device. On the customer side, a POS device may display several items that the customer can select from and may further present payment options and steps for completing a transaction. On the merchant side, a POS device may display similar options to that of the customer side, but may also include options for accepting and denying online orders, such as pick-up and delivery orders, and editing current orders.

Conventional POS devices may be in the form of a kiosk or a tablet, wherein the former may allow for separating a customer zone from a merchant zone, and the latter may allow for using only a single computing device to perform both customer and merchant functions. However, kiosks are often implemented as standalone devices that require using separate computers for customers and merchants, which can raise costs, require more computational resources, and necessitate internetworking or other communication systems to allow the customer POS device to communicate with the merchant POS device. Tablets, while they may require less computational resources than systems that use kiosks, may reduce an efficiency as customer and merchant functions are asynchronously performed on a single display. Therefore, when customer functions are being performed on the display, such as to make a payment, the merchant cannot perform other merchant functions, such as accepting delivery orders, unless there is another computer, which cancels out the benefit of using a tablet POS device for reduced computational resources.

Moreover, because payment processing involves communication with remote servers or services, there can be a slow-down in operations when multiple customers are making payments using different displays within a short period of time. For example, the later payment information may not be processed due to lack of payment processing availability. Additional POS devices also increase complexity in network design (e.g., by requiring additional infrastructure to account for the POS devices at a merchant location, by requiring additional resources to account for multiple POS devices on the payment processing side, or the like).

A possible solution to such problems is to use a single computer connected to multiple displays, such as a touch screen for the merchant and a touch screen for the customer. However, certain operating systems are incompatible with multiple inputs occurring simultaneously or semi-simultaneously, particularly with input elements that require continuous focus, such as text input fields. For example, with a text input field, focus on the text input field can be lost if an interaction, such as a click or touch, is performed on anywhere other than the text input field. Therefore, if a customer touches the customer touch screen while the merchant is entering text using a virtual or physical keyboard into a text input field displayed on the merchant touch screen, focus on the text input field will be lost and subsequent text entered by the merchant will be fed somewhere other than the text input field.

Therefore, there is a need for improved systems and methods for dynamically controlling inputs and modifying user interface elements associated with a multi-display device, such as a point-of-sale (POS) device, such that a single computer may successfully process inputs received from multiple touch screens being used at the same time.

There is also a need for improved systems and methods for submitting payments by the multi-display device, such that a single computer with a single payment device may successfully process multiple payments received from multiple displays being used at the same time.

SUMMARY

One aspect of the present disclosure is directed to a computer-implemented system comprising one or more memory devices storing instructions, a first touch display configured to receive one or more touch inputs, a second touch display configured to receive one or more touch inputs, and one or more processors, communicatively coupled to the first touch display and the second touch display, configured to execute the instructions to perform a method for dynamically controlling a multi-display device. The method includes receiving a first input via the first touch display, and in response to receiving the first input, enabling a first input mode, wherein enabling the first input mode causes the one or more processors to detect one or more first input elements displayed on at least one of the first touch display or the second touch display, generate one or more second input elements, and replace the one or more first input elements with the generated one or more second input elements for display on at least one of the first touch display or the second touch display. The method further includes receiving a second input associated with at least one of the first touch display or the second touch display, determining whether the first input mode is enabled, and based on determining whether the first input mode is enabled, denying the second input.

Another aspect of the present disclosure is directed to a method for dynamically controlling a multi-display device. The method includes receiving a first input via the first touch display, and in response to receiving the first input, enabling a first input mode, wherein enabling the first input mode causes the one or more processors to detect one or more first input elements displayed on at least one of the first touch display or the second touch display, generate one or more second input elements, and replace the one or more first input elements with the generated one or more second input elements for display on at least one of the first touch display or the second touch display. The method further includes receiving a second input associated with at least one of the first touch display or the second touch display, determining whether the first input mode is enabled, and based on determining whether the first input mode is enabled, denying the second input.

Yet another aspect of the present disclosure is directed to a computer-implemented system comprising one or more memory devices storing instructions, a first touch display configured to receive one or more touch inputs, a second touch display configured to receive one or more touch inputs, and one or more processors, communicatively coupled to the first touch display and the second touch display, configured to execute the instructions to perform a method for dynamically controlling a multi-display device. The method includes receiving a first input, in response to receiving the first input, enabling a first input mode by replacing one or more continuous input elements with one or more discrete input elements for display on at least one of the first touch display or the second touch display, receiving a second input associated with the second touch display, determining whether the first input mode is enabled, and in response to determining that the first input mode is enabled, denying the second input. The method further includes detecting a trigger event, and in response to detecting the trigger event, disabling the first input mode.

Yet another aspect of the present disclosure is directed to a computer-implemented system comprising one or more memory devices storing instructions, a first software interface presented on a first display configured to receive a first payment information from a first software interface, a second software interface presented on a second display configured to receive a second payment information from a second software interface, a payment device configured to process payments, and one or more processors, communicatively coupled to the first display and the second display, configured to execute the instructions to perform a method for submitting payments by a multi-display device. The method includes establishing and maintaining a payment processing queue storing payment information in chronological order, receiving a first payment information from the first software interface associated with a first timestamp, in response to receiving the first payment information, disabling writing access to the payment processing queue from the second software interface presented on the second display, adding the first payment information to the payment processing queue, re-enable the writing access to the payment processing queue from the second software interface presented on the second display, reading, from the payment processing queue, a current payment information with an earliest timestamp, and submitting the current payment information for payment processing via the payment device.

Other systems, methods, and computer-readable media are also discussed herein.

4

Figure 2:
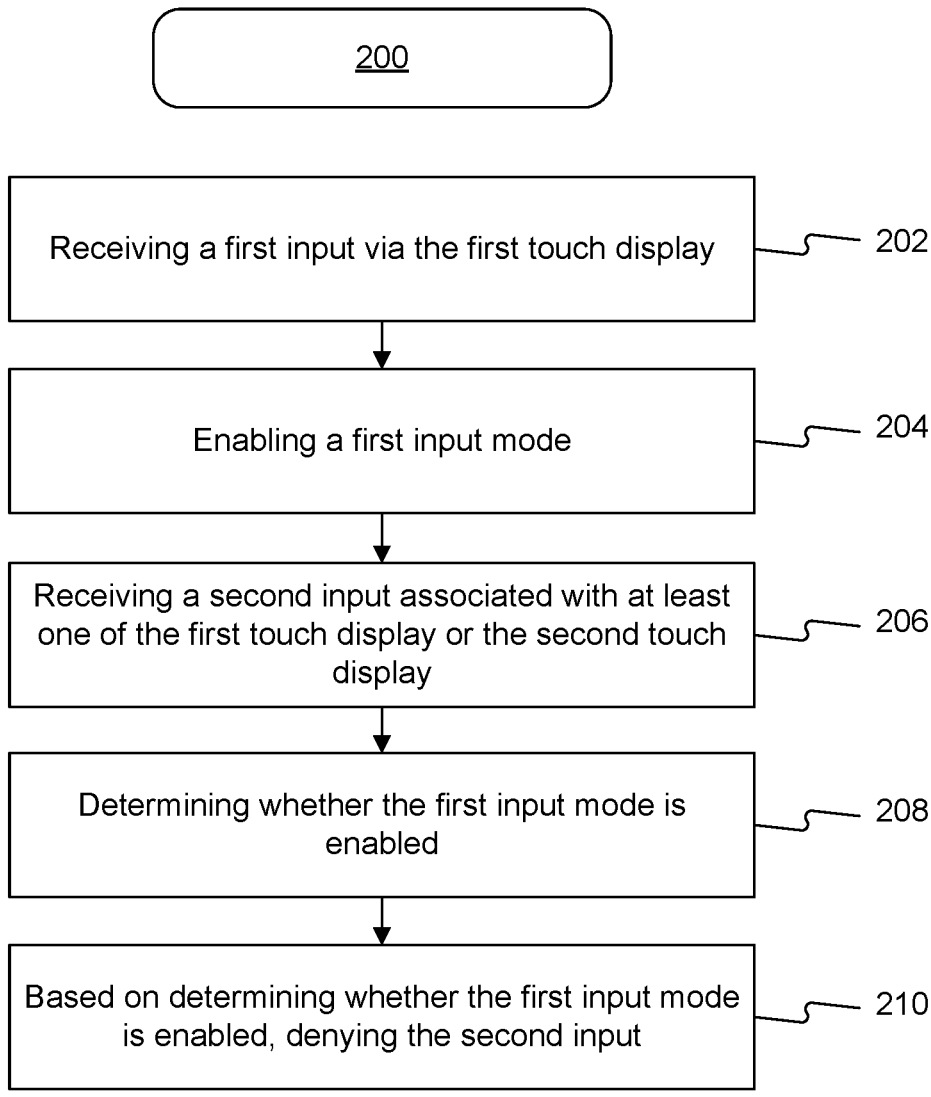

FIG. 2 shows an exemplary method for dynamically controlling inputs and modifying user interface elements associated with a multi-display device, consistent with the disclosed embodiments.

Figure 3A:
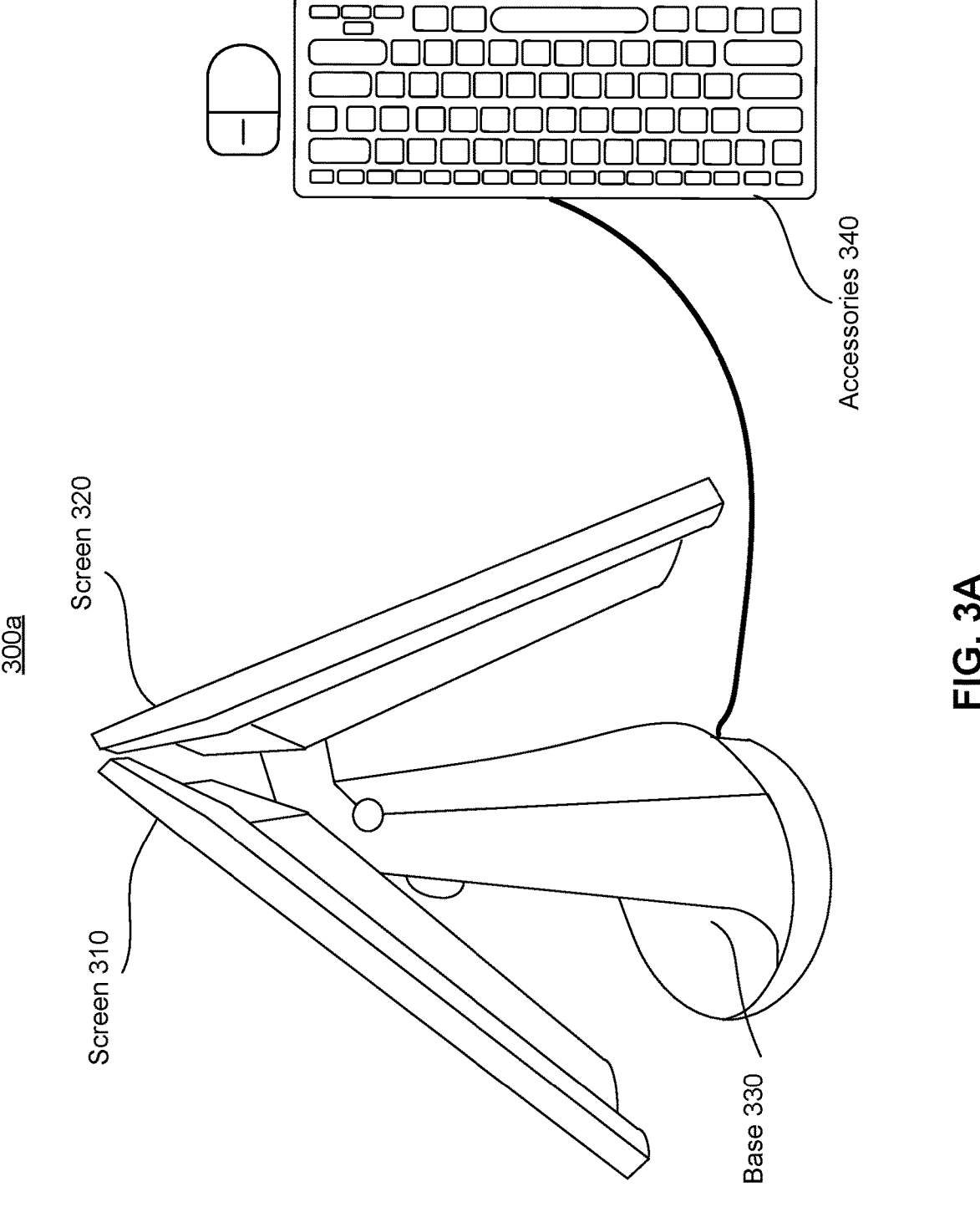
Figure 3B:
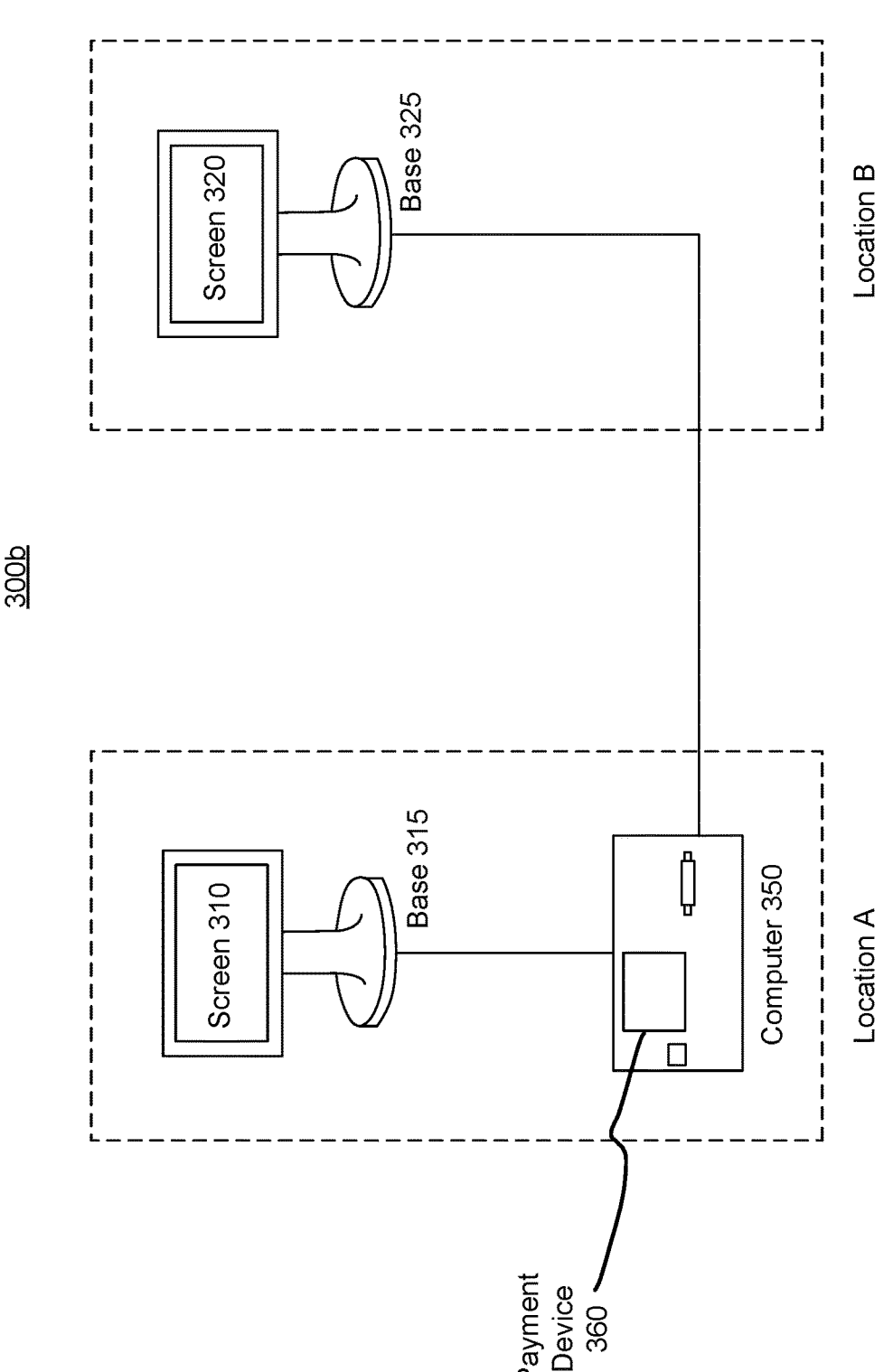

FIGS. 3A and 3B illustrate exemplary embodiments of a multi-display device, consistent with the disclosed embodiments.

Figure 4A:
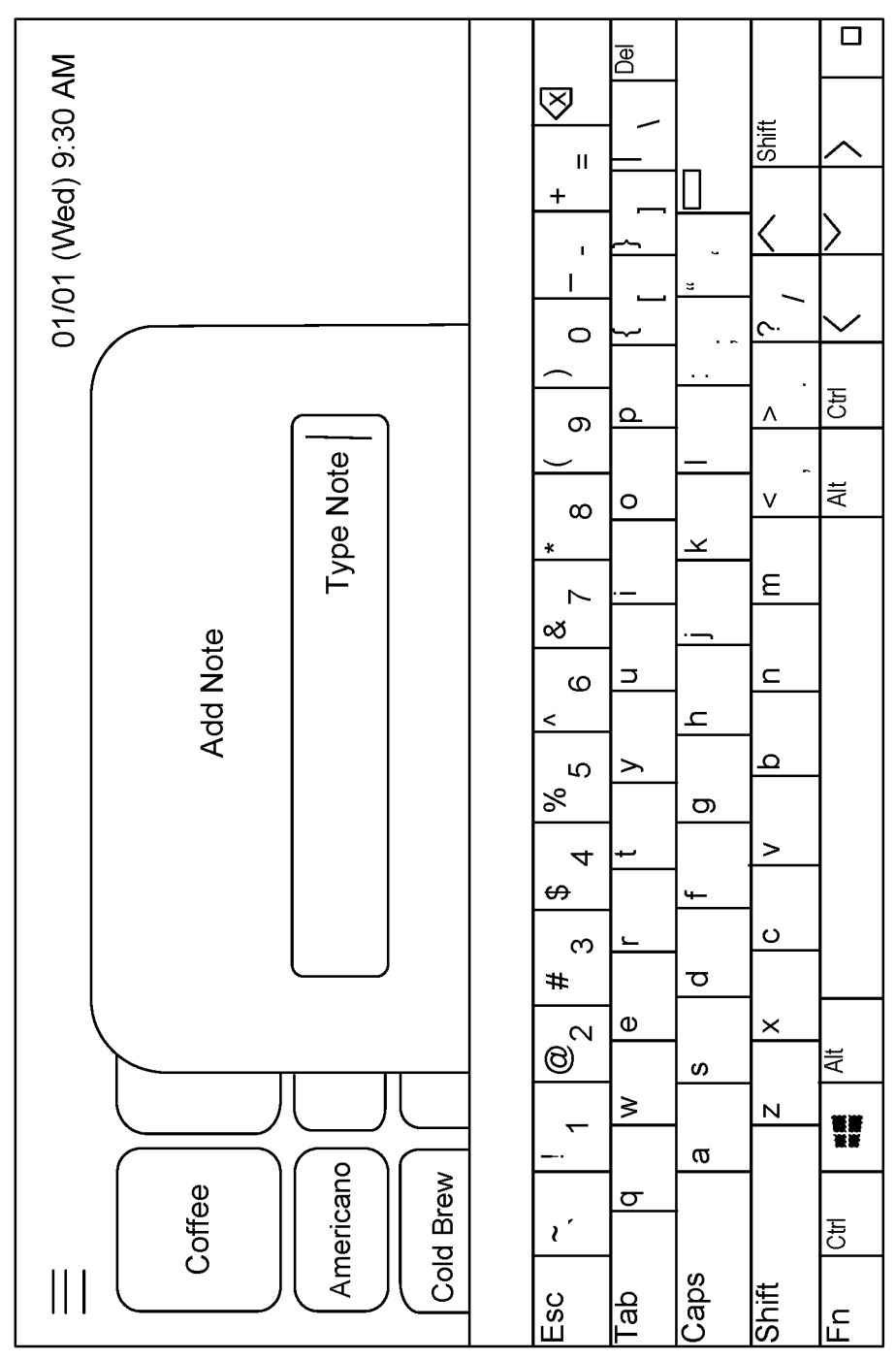

FIG. 4A depicts an exemplary user interface displayed in a non-POS mode, consistent with the disclosed embodiments.

Figure 4B:
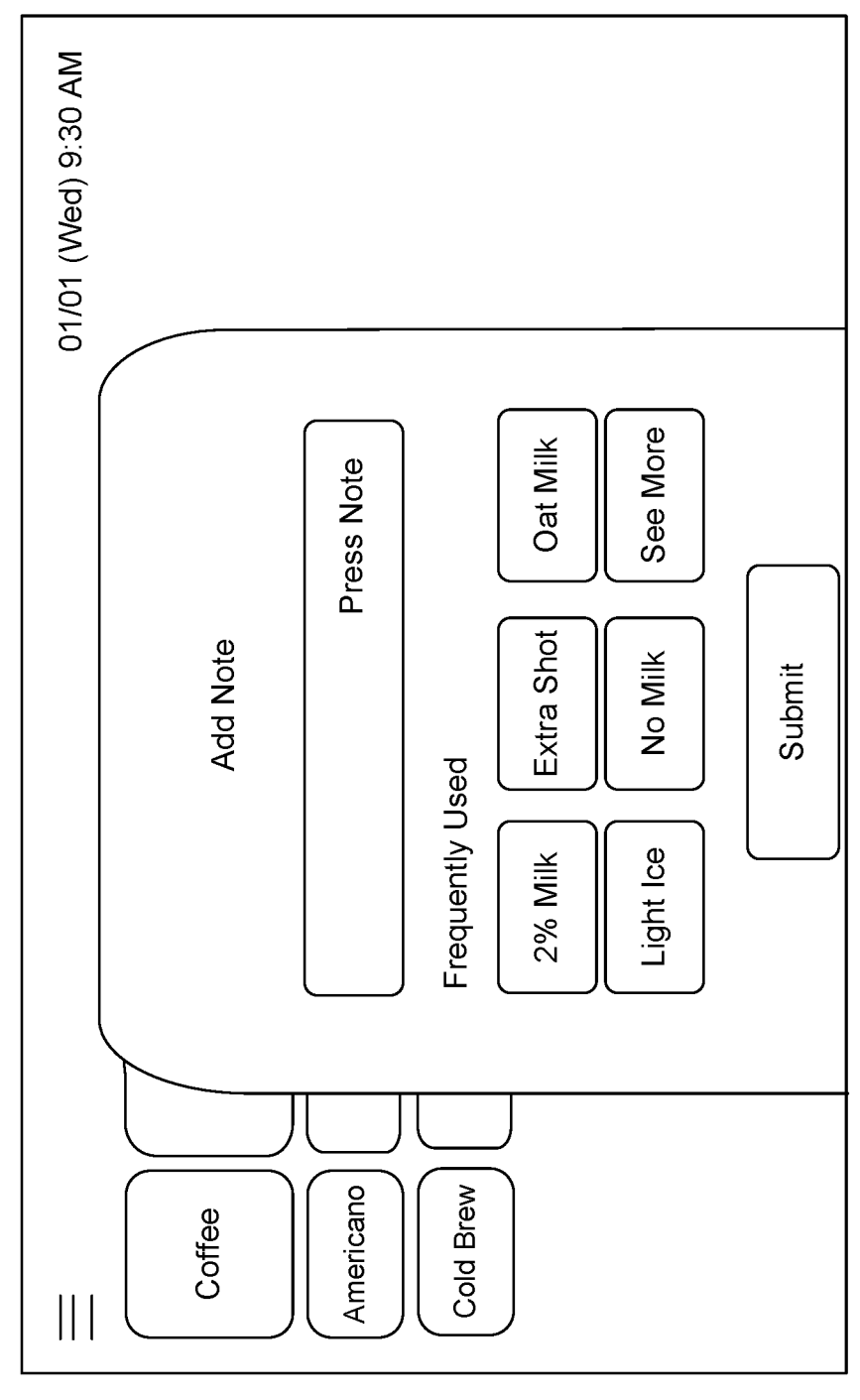
Figure 4C:
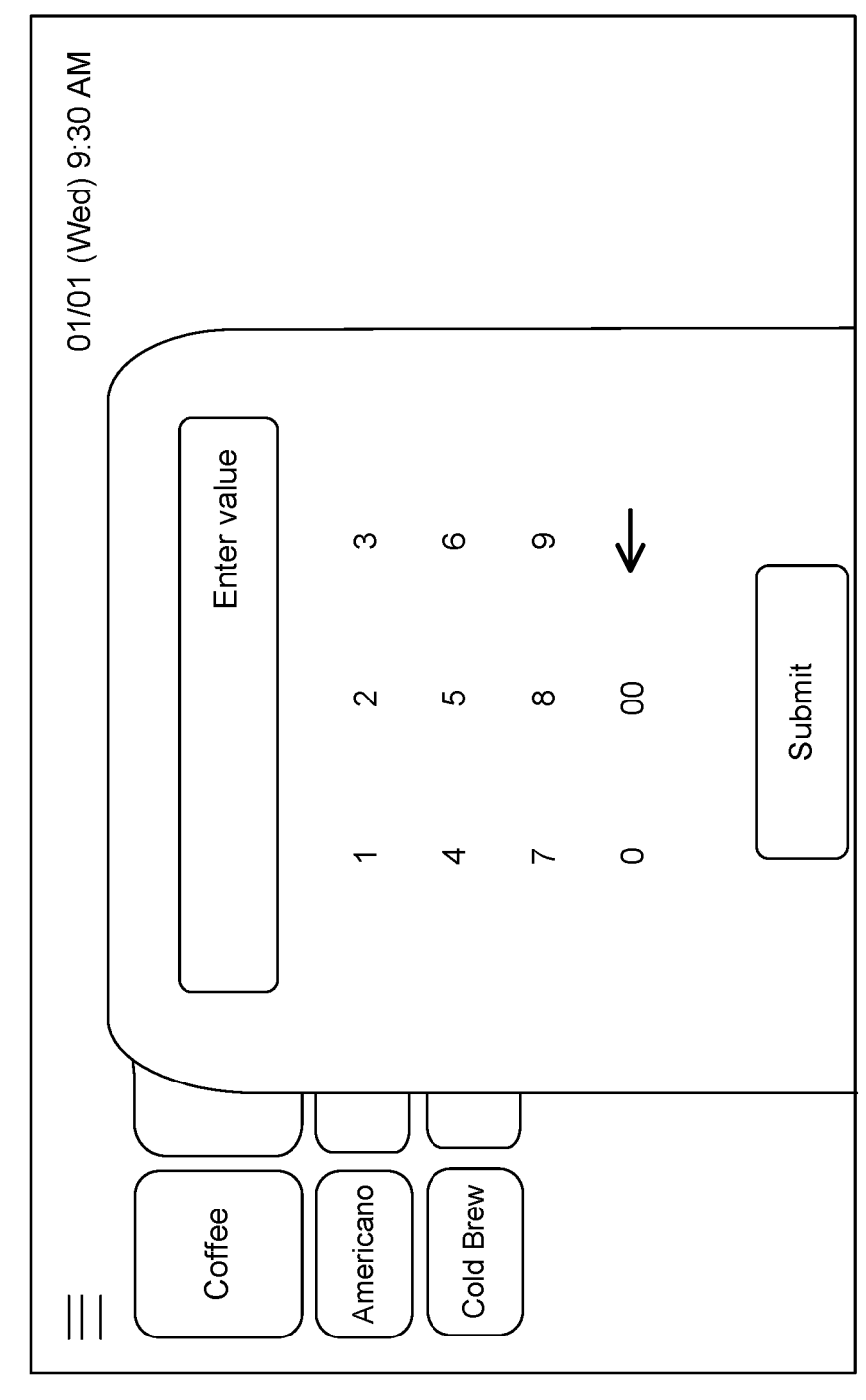

FIGS. 4B and 4C depict exemplary user interfaces displayed in a point-of-sale (POS) mode, consistent with the disclosed embodiments.

Figure 5:
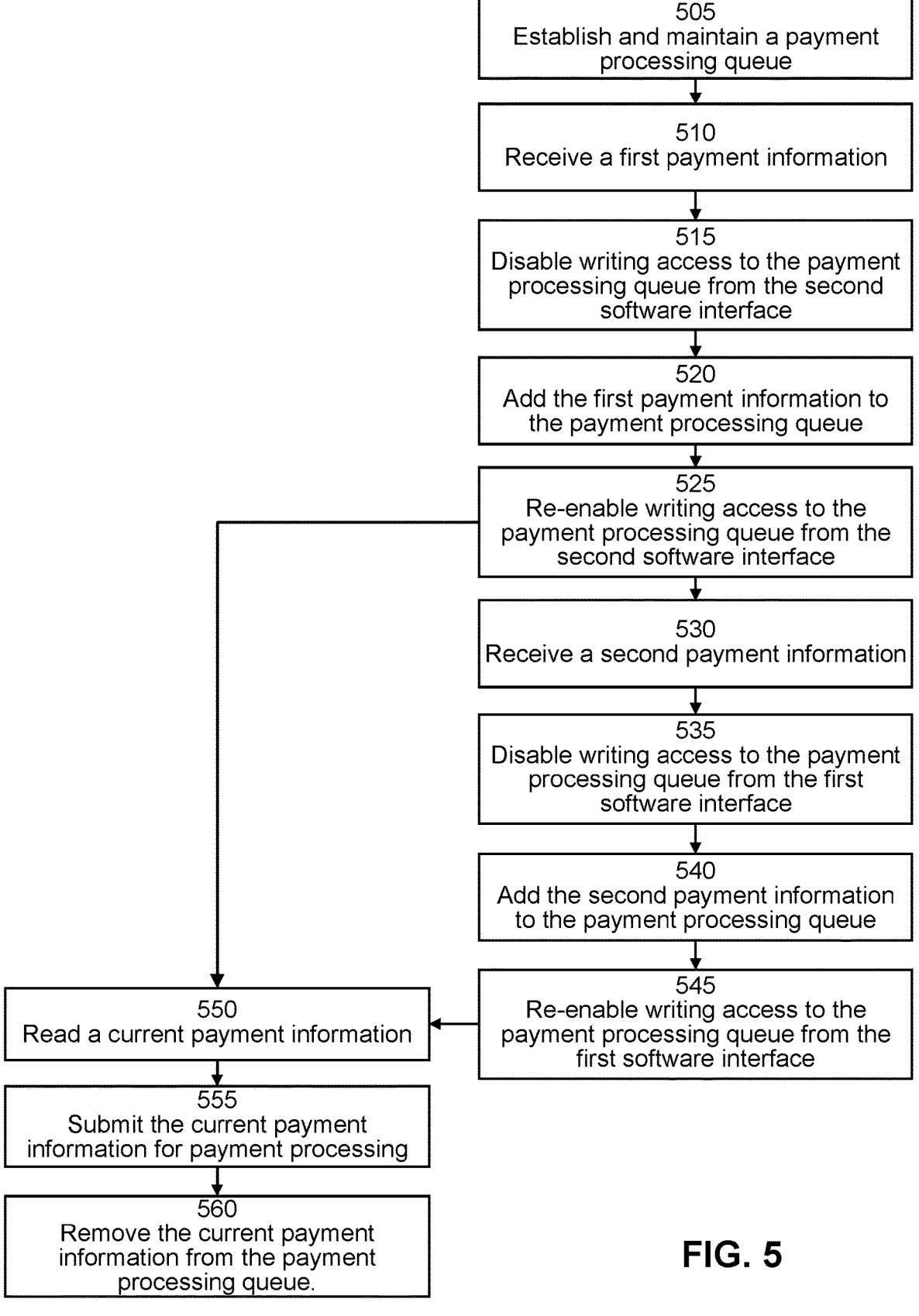

FIG. 5 is an illustration of a method for submitting payments by the multi-display device, consistent with some embodiments of this disclosure.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for dynamically processing payments controlling a multi-display device, such as a POS device, by establishing and maintaining a payment processing queue storing payment information in chronological order, receiving a first payment information from the first software interface associated with a first timestamp, disabling writing access to the payment processing queue from the second software interface presented on the second display in response to receiving the first payment information, adding the first payment information to the payment processing queue, re-enable the writing access to the payment processing queue from the second software interface presented on the second display, reading a current payment information with an earliest timestamp from the payment processing queue, and submitting the current payment information for payment processing via the payment device. The method further includes receiving a second payment information from the second software interface associated with a second timestamp, disabling writing access to the payment processing queue from the first software interface presented on the first display in response to receiving the second payment information, adding the second payment information to the payment processing queue, and re-enable the writing access to the payment processing queue from the first software interface presented on the first display. The disclosed embodiments provide innovative technical features that allow for implementation of a multi-display device using a single computer, wherein the multi-display device is configured to process payments received from at least two displays, and wherein the at least two displays are being used at the same time. For example, disclosed embodiments enable efficient usage of computational resources, enables simultaneous usage of multiple displays connected to a single computer.

Figure 1:
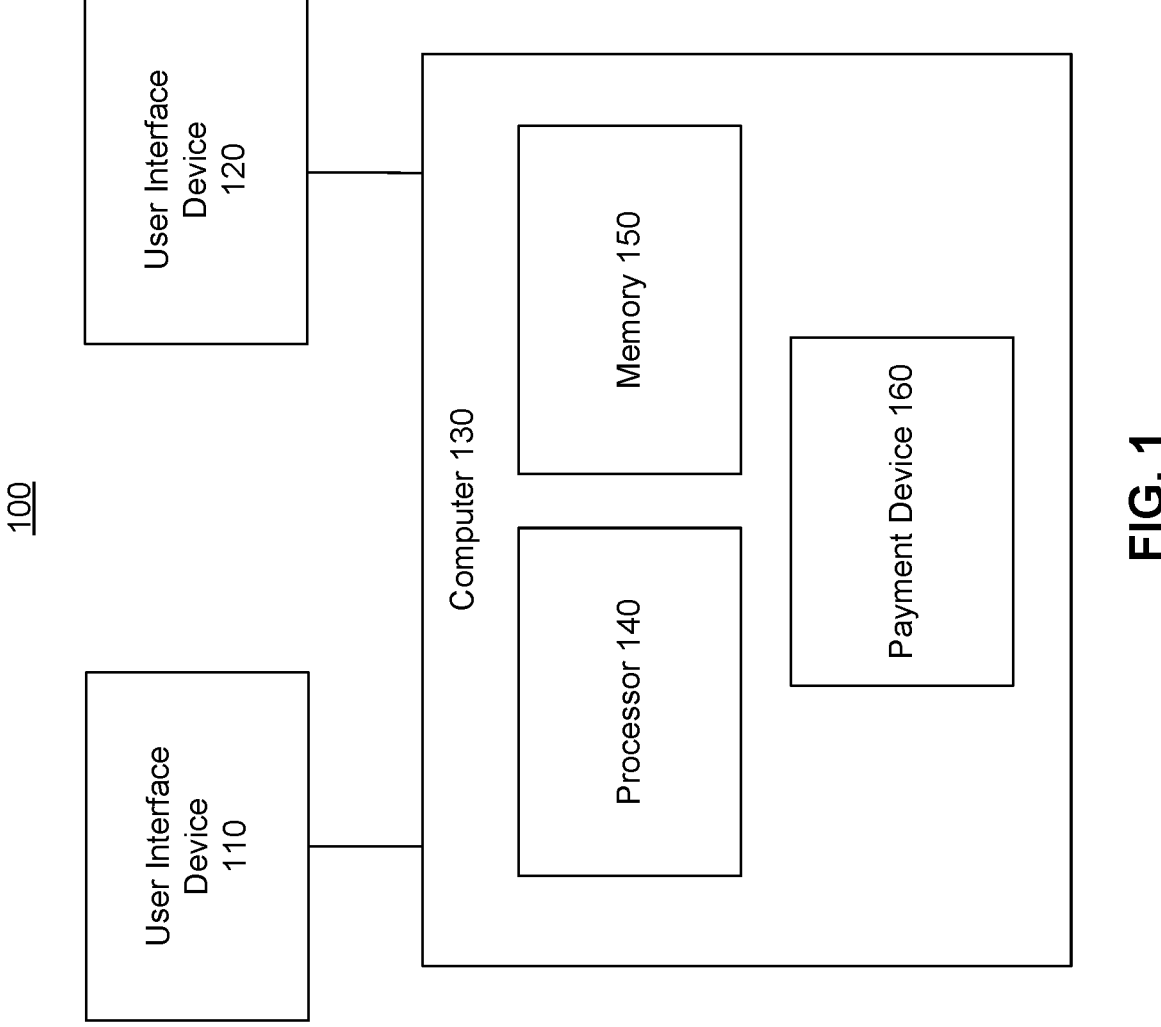
FIG. 1 is a schematic block diagram illustrating an embodiment of a computerized system for dynamically controlling inputs and modifying user interface elements associated with a multi-display point-of-sale (POS) device, consistent with the disclosed embodiments.

FIG. 1 is a schematic block diagram illustrating components of an exemplary system 100, consistent with disclosed embodiments. In some embodiments, and as discussed throughout this disclosure, system 100 is a POS (point-of-sale) device, but one of ordinary skill will understand that system 100 has applications outside of a POS environment. As shown in FIG. 1, embodiments of a system 100 may include user interface devices 110 and 120, and computer 130 comprising one or more processors 140, one or more memory devices 150, and a payment device 160.

User interface devices 110 and 120 may be any input/output (I/O) devices (e.g., touch screen, monitor, touch panel, tablet, card reader, chip reader, camera) configured to receive user inputs. For example, user interface devices 110 and 120 may comprise pressure-sensitive devices. In some embodiments, user interface devices 110 and 120 may be configured to display various user interfaces to one or more users. Additionally, user interface devices 110 and 120 may be configured to receive one or more inputs from one or more users, such as touch inputs and/or inputs received from input/output devices, and may generate one or more outputs in response to the received one or more inputs. In some embodiments, user interface devices 110 and 120 may be configured to display different information, such as one or more different applications. Additionally or alternatively, user interface devices 110 and 120 may be configured to display the same information. In some embodiments, at least one of user interface devices 110 or 120 may include or be connected to various input/output devices, such as a keyboard, pointing device (e.g., a mouse), a card reader, a chip reader, a camera, a microphone, a gesture sensor, an action sensor, a physical button, etc. In some embodiments, only one of user interface devices 110 and 120 may be connected to a keyboard and/or pointing device. Additionally or alternatively, at least one of user interface devices 110 or 120 may be configured to collect and process video and audio signals.

In some embodiments, user interface devices 110 and 120 may include or connect to one or more payment information collecting devices configured to collect payment information from a user. For example, the one or more payment information collecting devices may include a credit card reader to obtain credit card information necessary for payment processing by swiping a card, reading a chip embedded in a card, or reading data from a card via Near Field Communication (NFC). In some embodiments, user interface devices 110 and 120 may include one or more communication modules (not shown) for sending and receiving information from external devices by, for example, establishing wired or wireless connectivity between user interface devices 110 and 120 and a network (not pictured). In some embodiments, system 100 may include more than two user interface devices. In some embodiments, user interface devices 110 and 120 may be comprised within a single user interface device.

Computer 130 may be any computing device (e.g., desktop computer, laptop, server) configured to house one or more processors 140 and one or more memory devices 150, as well as a payment device 160 and other hardware components. Computer 130 may be configured for wired and/or wireless communications and may include software that when executed by one or more processors 140 performs internet-related communication (e.g., TCP/IP) and content display processes. In some embodiments, computer 130 may include or be connected to various input/output devices, such as a keyboard, pointing device, a camera, a microphone, a gesture sensor, an action sensor, a physical button, etc. In some embodiments, computer 130 may be configured such that inputs received from an input/output device may be displayed on one user interface device but not the other, such as by modifying configuration settings for computer 130. Processor 140 may be any processing unit (e.g., computing device, microcontroller, microprocessor, system-on-chip, digital signal processor) configured to perform operations based on instructions stored in one or more memory devices, such as memory 150. For example, processor 140 may execute applications to communicate with components over a network (not pictured) and display content via user interface devices 110 and 120. Memory 150 may be volatile or non-volatile, magnetic, semiconductor, tape, optical, removable, non-removable, or other type of storage device or tangible computer readable medium, and may store one or more operating systems, such as Microsoft Windows, Unix, Linux, Android, Mac OS, iOS, or other types of operating systems.

In some embodiments, payment device 160 may be part of computer 130 and in communication with a financial institution or payment app through computer 130 that can submit payment information for processing. In some embodiments, such submission may require an internet connection. For example, payment device 160 may be a system configured to transmit credit card information (e.g., credit card number, card holder name, expiration date, security code, zip code) collected by the payment information collecting devices to an issuing bank. In another example, payment device 160 may be a system configured to transmit facial recognition data collected by the payment information collecting devices to a payment processing app (e.g., AliPay, PayPal.)

In some embodiments, system 100 may be connected to a network (not pictured) configured to provide communications between components internal to system 100 as well as communications with devices external to system 100. For example, the network may be any type of network (including infrastructure) that provides communications, exchanges information, and/or facilitates the exchange of information, such as the Internet, or other suitable connection(s) that enables the sending and receiving of information between devices. In other embodiments, the network may include multiple networks, organizing for example a network of networks. In some embodiments, user interface devices 110 and 120 may be connected but not connected to each other via a network.

FIG. 2 shows an exemplary method 200 for dynamically controlling inputs and modifying user interface elements associated with system 100 which may be implemented as a multi-display device, such as a point-of-sale (POS) device, consistent with disclosed embodiments. In some embodiments, method 200 or a portion thereof may be performed by one or more processors 140 or one of systems 100, 300*a* (described in of FIG. 3A description below), or 300*b* (described in FIG. 3B description below). For example, systems may include a first touch display configured to receive one or more touch inputs, a second touch display configure to receive one or more touch inputs, one or more processors communicatively coupled to the first touch display and the second touch display, and one or more memory devices storing instructions that, when executed by the one or more processors, cause the system to perform the steps shown in FIG. 2. In some embodiments, the first touch display may comprise a customer-side touch display and the second touch display may comprise a merchant-side touch display. Additionally or alternatively, the first touch display and the second touch display may be physically connected to each other (either directly or through another device such as computer 130).

At step 202, one or more processors may be configured to receive a first input via the first touch display. In some embodiments, the first input may comprise a touch input. For example, system 100 may receive a first touch input signal via a first user interface presented on the first touch display. In some embodiments, the first user interface may include various elements selectable via touch and/or via I/O devices (e.g., pointing device, keyboard, card reader, chip reader, camera). For example, system 100 (e.g., at a coffee shop) may present on the first touch display one or more items, such as one or more categories (e.g., hot coffees, iced coffees, teas, seasonal, food, etc.) and/or one or more items within each category (e.g., for hot coffees, americano, cappuccino, espresso, etc.) in the form of selectable user interface elements. Additionally or alternatively, system 100 may present one or more payment options in the form of selectable user interface elements. In some embodiments, the first user interface may obtain payment information from selectable user interface elements, or by recognizing a payment method. In some embodiments, the one or more payment options may include different payment methods, for example, by cash, by electronic payment methods, by vouchers, by checks. In some embodiments, the payment method may comprise paying by a credit card, a debit card, a stored value card, or any other kind of card, token, or item able to be used for payment. In some embodiments, the first input may comprise a touch input selecting a user interface element. In some embodiments, the first input may comprise an input selecting a user interface element using an I/O device, such as a pointing device or keyboard. In some embodiments, the first input may comprise a touch input to awaken the display, such as if the display has gone to sleep. In some embodiments, the first input may comprise a touch input received on any pressure-sensitive surface of the first touch display, wherein the first touch display may be configured to transmit the input received on any pressure-sensitive surface of the first touch display to the one or more processors for further processing. In some embodiments, the first input may comprise an input from an additional device in communication with an I/O device, for example, a credit card reader, a facial recognition device, a near field communication (NFC) chip reader, etc.

In some embodiments, prior to receiving the first input, the one or more processors may be configured to detect a user. For example, the one or more processors may be configured to receive one or more detection signals from one or more sensors (e.g., camera, gesture sensor, action sensor) communicatively coupled and/or physically connected to system 100. In some embodiments, at least one of the one or more sensors may be configured to continuously collect sensor data.

At step 204, the one or more processors may be configured to enable a first input mode. For example, in some embodiments, the one or more processors may enable the first input mode by modifying a bit or other element in memory (e.g., in a data structure) in order to signify that the first input mode is enabled. In other embodiments, the one or more processors may enable the first input mode by modifying the registry of system 100's operating system. For example, the system 100's operating system may be Microsoft Windows, and the one or more processors may automatically modify the Windows registry to enable the first input mode in response to certain events, such as events described below.

In some embodiments, enabling the first input mode may comprise disabling certain inputs or may cause the one or more processors to disable certain inputs. For example, enabling the first input mode may comprise dynamically changing one or more settings to disable inputs received from one or more physical and/or virtual keyboards. In some embodiments, enabling the first input mode may comprise dynamically disabling connection to one or more physical keyboards. A keyboard as discussed in the disclosed embodiments may comprise a physical or virtual mechanism to input letters, numbers and/or characters into a continuous input field, such as into a text input field. For example, a virtual keyboard may be a software keyboard presented on a display and configured for touch inputs. In some embodiments, enabling the first input mode may comprise dynamically changing one or more settings to disable one or more inputs received from one or more pointing devices. For example, one or more inputs received from the one or more pointing devices may comprise movement signals and/or hover signals. In some embodiments, enabling the first input mode may allow scroll signals and/or click signals to be received from the one or more pointing devices. In some embodiments, enabling the first input mode may comprise dynamically disabling connection to the one or more pointing devices. In some embodiments, enabling the first input mode may include using at least one of JavaScript or custom scripts to enable and/or disable certain user interface elements and inputs.

In some embodiments, the one or more processors may be configured to enable the first input mode in response to receiving the first input. In some embodiments, the one or more processors may be configured to enable the first input mode in response to detecting the user. For example, the at least one processor may be configured to enable the first input mode in response to receiving the one or more detection signal from the one or more sensors. In some embodiments, the one or more processors may be configured to enable the first input mode in response to receiving an on/off signal from a virtual or physical button. For example, the virtual button may be a user-interface button presented on the first touch display and/or the second touch display. The physical button may be a physical button communicatively coupled and/or physically connected to system 100.

In some embodiments, the first input mode may include detecting one or more first input elements displayed on at least one of the first touch display or the second touch display. For example, detecting one or more first input elements may include inspecting all input elements displayed on at least one of the first touch display or the second touch display and checking one or more properties of each input element to determine whether the input element is a first input element. In some embodiments, the one or more first input elements may comprise continuous input elements. Continuous input elements as discussed in the disclosed embodiments may include inputs and/or input fields that require continuous focus, such as those illustrated and discussed in FIG. 4A below. For example, inputs from a physical and/or virtual keyboard may require continuous focus on a particular text input field because changing the focus from the particular text input field to another user interface element will not feed succeeding inputs received from the physical and/or virtual keyboard into the particular text input field until focus is returned to the particular text input field. Additionally or alternatively, inputs such as hover signals and/or movement signals received from a pointing device may require continuous focus.

In some embodiments, the one or more first input elements may comprise text input fields configured to receive input from only a physical keyboard or a virtual keyboard. Additionally or alternatively, the one or more first input elements may comprise a virtual keyboard.

In some embodiments, the first input mode may further comprise generating one or more second input elements. For example, the one or more second input elements may comprise discrete input elements. Discrete input elements as discussed in the disclosed embodiments may include all inputs and/or input fields that do not require continuous focus. For example, discrete inputs may comprise selectable user interface buttons, such as those illustrated and discussed in FIGS. 4B and 4C below.

In some embodiments, the one or more second input elements may consist of one or more non-keyboard inputs and one or more input fields configured to present the one or more non-keyboard inputs. For example, non-keyboard inputs may comprise user interface buttons, such as those illustrated and discussed in FIGS. 4B and 4C below. In some embodiments, the one or more second input elements may not comprise one or more text input fields configured to receive input from only a physical keyboard or a virtual keyboard.

In some embodiments, the first input mode may further comprise replacing the one or more first input elements with the generated one or more second input elements for display on at least one of the first touch display or the second touch display. For example, the first input mode may be a POS mode wherein when POS mode is enabled, the one or more processors may be configured to cause the first touch display and the second touch display to replace continuous input elements with discrete input elements. In some embodiments, the one or more processors may replace continuous input fields (e.g., text input fields) presented on the first touch display and/or second touch display with discrete input fields (e.g., input field configured to display a value of the selected discrete input(s)).

In some embodiments, the first input mode may further comprise obtaining inputs as a string from user interface device 110 or 120 via an I/O devices (e.g., a card reader, a chip reader). The I/O devices may be integrated to the user interface device 110 or 120, or may be communicatively connected to the user interface device 110 or 120. For example, a card reader may read a credit card and obtain information needed for processing payments, e.g., credit card number, card holder name, expiration date, security code, zip code.

At step 206, the one or more processors may be configured to receive a second input associated with at least one of the first touch display or the second touch display. For example, system 100 may receive a second input via a second user interface presented on the second touch display. In some embodiments, the second user interface may include various elements selectable via touch and/or via I/O devices (e.g., pointing device, keyboard, card reader, chip reader, camera). For example, system 100 may present on the second touch display one or more user interfaces to place orders, accept orders, edit orders, add notes, view ordered items for both in-store and online orders, apply discount amounts, etc. In some embodiments, the second input may comprise an input received from a physical keyboard communicatively coupled to system 100. In some embodiments, the second input may comprise a touch input received from a virtual keyboard. In some embodiments, the second input may comprise a touch input signal received in response to a user selecting a button included in the second user interface, wherein the button is a discrete input.

At step 208, the one or more processors may be configured to determine whether the first input mode is enabled. For example, in some embodiments, the one or more processors may check to determine whether a particular bit in a data structure indicating that the first input mode is enabled is set. As another example, in some embodiments, the one or more processors may check the operating system registry to determine whether the first input mode is enabled. In some embodiments, determining whether the first input mode is enabled may comprise using software, hardware, firmware, or a combination there of to determine the status of a first input mode.

At step 210, the one or more processors may be configured to, based on determining whether the first input mode is enabled, deny the second input. For example, based on determining that the first input mode is enabled, the one or more processors may ignore a second input, wherein the second input is an input received from the physical keyboard. Additionally or alternatively, based on determining that the first input mode is enabled, the one or more processors may ignore the second input, wherein the second input is an input received based on a touch signal generated in response to making a selection on a virtual keyboard.

In some embodiments, the one or more processors may be configured to, based on determining that the first input mode is enabled, accept the second input, wherein the second input is a discrete input. For example, based on determining that the first input mode is enabled, the one or more processors may be configured to accept a touch input selecting a button included in the second user interface, wherein the button is a discrete non-keyboard input.

In some embodiments, based on determining that the first input mode is enabled, the one or more processors may further request the second input be resent after a predetermined amount of time. For example, based on determining that the first input mode is enabled, the one or more processors may be configured to ignore an input with payment information from the second user interface, and request that the second user interface to resend the ignored payment information again after a period of time (e.g., after some time, on the order of milliseconds or seconds). In some embodiments, the second user interface may withhold the ignored payment information for the period of time and send it again without requesting additional user interactions with the system 100. This enables a more convenient system from a user's perspective because it appears to have processed the user's payment without needing to retry (despite multiple software using the device at the same time).

In some embodiments, the one or more processors may be configured to, based on determining that the first input mode is not enabled, accept both continuous and discrete inputs via both the first touch display and the second touch display. In some embodiments, the one or more processors may be configured to, based on determining that the first input mode is not enabled, accept both continuous and discrete inputs via only one of the first touch display or the second touch display.

In some embodiments, the one or more processors may be configured to detect a trigger event. For example, detecting the trigger event may comprise determining that a predetermined time has passed since input was last received via the first user interface of the first touch display. In some embodiments, system 100 may further comprise one or more sensors, and detecting the trigger event may comprise detecting that no users are in front of the first touch display based on information received from the one or more sensors. For example, the one or more sensors may comprise one or more cameras configured to collect video stream data. In some embodiments, the one or more processors may be configured to use a pre-trained neural network (e.g., recurrent neural network, long short-term memory, artificial neural network, convolutional neural network) to detect one or more users using information received from the one or more sensors, and the one or more processors may be further configured to use the pre-trained neural network to detect that no users are in front of the first touch display.

In some embodiments, the one or more processors may be configured to, in response to detecting the trigger event, enable a second input mode. For example, enabling the second input mode may comprise disabling the first input mode. The one or more processors may be configured to enable the second input mode and disable the first input mode using similar techniques as discussed above with respect to enabling the first input mode.

In some embodiments, enabling the second input mode may comprise causing both the first touch display and the second touch display to accept one or more inputs via first input elements. Alternatively, enabling the second input mode may comprise causing only one of the first touch display and the second touch display to accept user input via first input elements. For example, enabling the second input mode may cause the second touch display to accept user input via first input elements. In some embodiments, in the second input mode, first input elements may have higher display priority than second input elements. For example, when the second input mode is enabled, the one or more processors may be configured to display first input elements (e.g., user interface illustrated in FIG. 4A) over second input elements (e.g., user interface illustrated in FIG. 4B) in situations where either could be displayed. In some embodiments, the second input mode may be enabled whenever the first input mode is disabled, and vice versa.

FIGS. 3A and 3B illustrate exemplary systems 300a and 300b, consistent with disclosed embodiments. In some embodiments, and as discussed throughout this disclosure, systems 300a and 300b are POS (point-of-sale) devices, but one of ordinary skill will understand that systems 300a and 300b have applications outside of a POS environment. System 300a may include display 310, display 320, base 330, one or more accessories 340, a computer (not pictured) including a payment device (i.e., 160 in FIG. 1, not shown in FIG. 3A,) or other components consistent with disclosed embodiments. System 300b may include display 310, base 315, display 320, base 325, computer 350 or other components consistent with disclosed embodiments. Display 310 and display 320 may be touch displays configured to receive touch input and/or input from one or more accessories 340. Accessories 340 may include, for example, keyboard, mouse, card reader, chip reader, camera, and/or other I/O devices configured to receive user inputs. Bases 315, 325 and 330 may be supportive structures designed to hold up displays 310 and 320. In some embodiments, Systems 300a and 300b may be configured for wired communication (e.g., high speed internet cables, fiber optic cables, USB cable, or other cables) and wireless communication (e.g., cellular, LTE, LoRA (long range wireless) module, a GSM transceiver, a 3G transceiver, a 4G transceiver, a Wi-Fi router, or other equipment for wireless communication). In some embodiments, systems 300a and 300b include one or more cameras (not pictured). In some embodiments, a display and computer may be comprised within a single device (e.g., tablet) configured to allow connection with other displays.

Components of a system may be distributed at various locations within a physical location as shown in system 300b of FIG. 3B. For example, display 310, base 315 and computer 350 may be in location A of a retail store and display 320 and base 325 may be in location B of the retail store and connected to the components in location A using a long cable. The configuration shown in FIG. 3B may be capable of separating a merchant-side of a store (e.g., Location A) from a customer-side of the store (e.g., Location B) while reducing computational resources. In some embodiments, each of the locations may have one or more accessories 340, for example, keyboards, mouse, cameras, fingerprint readers, card readers.

Both configurations shown in FIGS. 3A and 3B may enable a single computer (e.g., computer 350) to efficiently and effectively generate user interfaces that allow for processing inputs received from separate touch screens being used by different users at the same time.

FIG. 4A-4C depict exemplary user interfaces that may be displayed on one or more touch screens of a system (e.g., systems 100, 300a, or 300b). For example, as shown in FIG. 4A, interface 400a may be an exemplary interface displayed on one or more touch screens (e.g., user interface device 110, user interface device 120, display 310, display 320) before a first input mode is enabled and/or after the first input mode is disabled (i.e., when a second input mode is enabled), as discussed above with respect to step 210 of FIG. 2. Interface 400a may comprise one or more continuous input elements as well as one or more discrete input elements, and may allow inputs to be received via a virtual keyboard, as illustrated, as well as a physical keyboard connected to the POS system. The received inputs may be fed into and displayed in a text input field (e.g., text box with "Type Note"). For example, interface 400a may be presented on a merchant-side touch screen.

As shown in FIG. 4B, once the first input mode is enabled (as discussed above with respect to, e.g., FIG. 4), the system may generate interface 400b and may replace interface 400a with interface 400b. For example, the system may identify and create a list of continuous input elements included in interface 400a. The system may further generate one or more discrete input elements and may replace the one or more continuous input elements of interface 400a such that interface 400b may comprise only discrete input elements. Interface 400b may allow discrete inputs such as touch, scroll, and drag inputs to be received via the touch screen and a pointing device connected to the system.

FIG. 4C illustrates another interface 400c that may be presented on a touch screen when the first input mode is enabled. For example, interface 400c may comprise discrete inputs in the form of selectable user interface buttons (e.g., 1, 2, 3, . . . 00, ←, "submit"). Interface 400c may further comprise one or more discrete input fields (e.g., box with "Enter value") configured to display one or more currently selected values. For example, if a touch input associated with the user interface button of "1" is first received, box with "Enter value" may be dynamically updated to display "1." If, subsequently, a touch input associated with the user interface button of "2" is received, box with "1" may be dynamically updated to display "12." If, subsequently, a touch input associated with the user interface button of "←" is received, box with "12" may be dynamically updated to display "1." While such input fields would normally be operated in a continuous manner (i.e., requiring focus on the field and accepting input via a software or hardware keyboard) and using, for example, operating system APIs and routines to receive input from such devices in a continuous manner, the input field in exemplary interface 400*c* would be implemented such that it would render inputs received through the selectable user interface buttons and render an input based on those inputs. For example, one or more processors may implement a stack data structure that accepts touch inputs of digits 0-9 as a "push" and touch inputs of the backspace ("←") key as a "pop" from the stack.

In some embodiments, I/O devices like card reader or chip reader may provide input (e.g., payment information) to interface 400*a*-400*c* as a string of characters. For example, card reader may read and input credit card number as a string of numbers to interface 400*c*, and may read and input credit card holder's name as a string of letters to interface 400*a*.

Some disclosed embodiments involve a computer-implemented system and method for submitting payments by a multi-display device, the system comprising one or more memory devices storing instructions, a first display configured to receive a first payment information from a first software interface, a second display configured to receive a second payment information from a second software interface, a payment device configured to process payments, and one or more processors, communicatively coupled to the first display and the second display, configured to execute the instructions to perform operations consistent with the disclosed methods.

In some embodiments, the first software interface and the second software interface are identical interfaces presented on different displays. Identical interfaces, in some embodiments, refers to interfaces with the same interface designs and functionalities being presented on different displays and may be capable of showing the same elements, but may at a specific time show different elements. For example, the first display and the second display each present a same software interface, making the first and second display functionally identical to the user. However, although both the first and second displays are capable of showing all of interfaces 400*a*-400*c*, at a specific time, the first display may display interface 400*a*, and the second display may display interface 400*b*. From the user's perspective, making payment on the first display and on the second display may have a same experience. In some embodiments, an identifier may present on the software interface and/or the display. In such cases, the first and second software interfaces may be identical except the identifier. For example, Customer A may use display #1 (with software interface #1 running on it) to make a payment for his order swiping his credit card, while Customer B may use display #2 (with software interface #2 running on it) to make a payment for his order paying with Apple Pay, the interfaces #1 and #2 are identical in the way that they have the same functionality, but may show different elements at a specific time. The interfaces #1 and #2 may have their own identifiers (i.e., #1 and #2, respectively) shown on a corner of the display.

In some embodiments, different displays may have different software interfaces. For example, one display may have a software interface designed for the merchant to view and manage orders, and the other displays may have a different software interface designed for customers to view and pay for only their order.

FIG. 5 is an illustration of a method for submitting payments by the multi-display device, consistent with some embodiments of this disclosure.

In some embodiments, in step 505, processor 140 may establish and maintain a payment processing queue storing payment information in chronological order. Payment processing may refer to the process of completing a payment transaction with a financial institution (e.g., bank, credit card issuer, gift card issuer), and/or a payment app (e.g., PayPal, Zelle, Venmo, Apple Wallet). In some embodiments, the payment processing queue may be stored in memory 150. In some embodiments, the payment processing queue may have multiple entries, each entry may have information necessary for submitting payment for processing. For example, an entry for payment processing may include information on payment method, payment amount, authorization, payment date and time, and/or any information might be needed for successful payment processing.

In some embodiments, in step 510, processor 140 may receive a first payment information from the first software interface of the first display associated with a first timestamp. In some embodiments, a user may enter payment information via the first software interface presented on the first display. The timestamp may be the time such payment information was obtained or transmitted. In some embodiments, the first software interface may be configured to present one or more input fields, the one or more input fields being configured to accept non-keyboard inputs. In some embodiments, the first display may be a touch display as discussed in previous sections. For example, the first display may be configured to receive one or more touch inputs. In some embodiments, the first display may comprise a customer-side touch display. For example, system 100 may receive a first touch input signal via the first software interface presented on the first display. In some embodiments, the first software interface may be a graphical interface that enables communication with a piece of software running on computer 130. In some embodiments, the first software interface may include various elements selectable via touch and/or via I/O devices (e.g., pointing device, keyboard).

In some embodiments, the first software interface may be configured to obtain payment information by recognizing a payment method. For example, system 100 may present one or more payment options in the form of selectable user interface elements. In some embodiments, the one or more payment options may comprise different payment methods, for example, by cash, by electronic payment methods, by vouchers, by checks. In some embodiments, the payment method may comprise paying by a credit card, a debit card, a stored value card, or any other kind of card, token, or item able to be used for payment.

In some embodiments, the first display may be integrated with, or in communication with, an additional device (i.e., payment information collecting device) to obtain payment information. For example, the first display may be integrated with, or in communication with, a credit card reader to obtain credit card information necessary for payment processing by swiping a card, reading a chip embedded in a card, or reading data from a card via Near Field Communication (NFC).

In some embodiments, the first software interface may be configured to obtain payment information by recognizing a payor. In some embodiments, the payor's biometric information is tied to a payment method. Recognizing a payor through biometric information may enable the system 100 to obtain the payment method tied to the payor. For example, the first software interface may recognize the payor by facial recognition, and proceed to obtain payment information tied to the payor from their financial institution or from a payment app.

In some embodiments, in step 515, processor 140 may disable writing access to the payment processing queue from the second software interface presented on the second display in response to receiving the first payment information. In some embodiments, disabling writing access to the payment processing queue may include denying a request to make changes to the payment processing queue and requesting a resend of the denied request after a predetermined time. For example, an input from the second software interface may be denied by not permitting the input be written into the payment processing queue. Subsequently, processor 140 may request the second software interface to resend the same input again after a predetermined time (e.g., milliseconds, seconds, minutes, or any interval the processor 140 may estimate that the writing access to the payment processing queue be re-enabled, as discussed below at least with respect to step 525).

In some embodiments, in step 520, processor 140 may add the first payment information to the payment processing queue. In some embodiments, the first payment information may be in the form of a payment entry for payment processing. In some embodiments, the payment entry may include information on payment method, payment amount, authorization, payment attempt date and time, and/or any information might be needed for successful payment processing.

In some embodiments, in step 525, after the first payment information is added to the payment processing queue, processor 140 may re-enable the writing access to the payment processing queue from the second software interface presented on the second display.

In some embodiments, in step 530, processor 140 may receive a second payment information from the second software interface of the second display associated with a second timestamp. In some embodiments, a user may enter payment information via the second software interface presented on the second display. In some embodiments, the second software interface may be configured to present one or more input fields, the one or more input fields being configured to accept non-keyboard inputs. In some embodiments, the second display may be a touch display as discussed in previous sections. For example, the second display may be configured to receive one or more touch inputs. In some embodiments, the second display may comprise a customer-side touch display. For example, system 100 may receive a second touch input signal via the second software interface presented on the second display. In some embodiments, the second software interface may, like the first software interface, be a graphical interface that enables communication with the same piece of software running on computer 130. In some embodiments, the first and second software interfaces may communicate with a different software running on computer 130. In some embodiments, the second software interface may include various elements selectable via touch and/or via I/O devices (e.g., pointing device, keyboard).

In some embodiments, the second software interface may be configured to obtain payment information by recognizing a payment method. For example, system 100 may present one or more payment options in the form of selectable user interface elements. In some embodiments, the one or more payment options may comprise different payment methods, for example, by cash, by electronic payment methods, by vouchers, by checks. In some embodiments, the payment method may comprise paying by a credit card.

In some embodiments, the second display may be integrated with, or in communication with, an additional device (i.e., payment information collecting device) to obtain payment information. For example, the second display may be integrated with, or in communication with, a credit card reader to obtain credit card information necessary for payment processing through card swipe, chip reading, or NFC reading.

In some embodiments, the second software interface may be configured to obtain payment information by recognizing a payor. In some embodiments, the payor's biometric information is tied to a payment method. Recognizing a payor through biometric information may enable the system 100 to obtain the payment method tied to the payor. For example, the second software interface may recognize the payor by facial recognition, and proceed to obtain payment information tied to the payor from their financial institution or from a payment app.

In some embodiments, in step 535, processor 140 may disable writing access to the payment processing queue from the first software interface presented on the first display in response to receiving the second payment information. In some embodiments, disabling writing access to the payment processing queue may enable the second input mode, in which all inputs from displays other than the first display (i.e. the first software interface) be denied. In some embodiments, disabling writing access to the payment processing queue may include denying a request to make changes to the payment processing queue and requesting a resend of the denied request after a predetermined time. For example, an input from the first software interface may be denied by not permitting the input be written into the payment processing queue. Subsequently, processor 140 may request the first software interface to resend the same input again after a predetermined time (e.g., milliseconds, seconds, minutes, or any interval the processor 140 may estimate that the writing access to the payment processing queue be re-enabled, as discussed below in step 545).

In some embodiments, in step 540, processor 140 may add the second payment information to the payment processing queue. In some embodiments, the second payment information may be in the form of a payment entry for payment processing. In some embodiments, the payment entry may include information on payment method, payment amount, authorization, payment date and time, and/or any information might be needed for successful payment processing.

In some embodiments, in step 545, after the second payment information is added to the payment processing queue, processor 140 may re-enable the writing access to the payment processing queue from the first software interface presented on the first display.

In some embodiments, in step 550, processor 140 may read a current payment information with an earliest timestamp from the payment processing queue. In some embodiments, the timestamp may be the time at which the payment information was received by the second software interface. In some embodiments, the timestamp may be the time at which the payment information was submitted by the first or second software interface. In some embodiments, the timestamp may be the time at which the payment information was added to the payment processing queue. In some embodiments, there may be at least one payment information in the payment processing queue. The current payment information may be the one having the earliest timestamp, and thus the next payment being processed.

In some embodiments, when only one user is submitting payment information through one of the interfaces, processor 140 may skip steps 530, 535, 540, 545, and execute step 550 after executing step 525.

In some embodiments, in step 555, processor 140 may submit the current payment information for payment processing via the payment device. In some embodiments, the payment device 160 may be part of computer 130 and in communication with a financial institution or payment app through computer 130 that can submit payment information for processing. In some embodiments, such submission may require an internet connection. In some embodiments, the payment processing may include submitting the payment information and receiving a confirmation from the financial institution or payment app confirming the successful submission of the payment information.

In some embodiments, in step 560, processor 140 may remove the current payment information from the payment processing queue upon receiving the confirmation that the payment information submission was successfully transmitted and received. In some embodiments, removing the current payment information from the payment processing queue may include deleting the current payment information from the payment processing queue. In some embodiments, removing the current payment information from the payment processing queue may include marking the current payment information as payment processed or complete. For example, the payment processing queue may include an indicator for each payment entry. Each indicator may indicate the status of the corresponding payment entry. In some embodiments, the status of a payment entry may indicate whether the payment entry has been processed (i.e., the payment information has been submitted for payment processing.)

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for submitting payments by a multi-display device, the system comprising:
   one or more memory devices storing instructions;
   a first display configured to receive a first payment information from a first software interface;
   a second display configured to receive a second payment information from a second software interface;
   a payment device configured to process payments; and
   one or more processors, communicatively coupled to the first display and the second display, configured to execute the instructions to perform operations comprising:
      establishing and maintaining a payment processing queue storing payment information in chronological order;
      receiving a first payment information from the first software interface of the first display associated with a first timestamp;
      in response to receiving the first payment information, disabling writing access to the payment processing queue from the second software interface presented on the second display by:
         enabling an input mode in which both the first display and the second display have text input fields configured to receive input from a physical keyboard or a virtual keyboard;
         denying a request from the second software interface to make changes to the payment processing queue; and
         requesting a resend of the denied request after a predetermined time;
      adding the first payment information to the payment processing queue;
      re-enabling the writing access to the payment processing queue from the second software interface presented on the second display;
      reading, from the payment processing queue, a current payment information with an earliest timestamp; and
      submitting the current payment information for payment processing via the payment device.

2. The computer-implemented system of claim 1, the instructions further comprising:
   receiving a second payment information from the second software interface of the second display associated with a second timestamp;
   in response to receiving the second payment information, disabling writing access to the payment processing queue from the first software interface presented on the first display;
   adding the second payment information to the payment processing queue; and
   re-enable the writing access to the payment processing queue from the first software interface presented on the first display.

3. The computer-implemented system of claim 1, the instructions further comprising removing the current payment information from the payment processing queue.

4. The computer-implemented system of claim 1, wherein the first and the second software interface each is configured to present one or more input fields, the one or more input fields being configured to accept non-keyboard inputs.

5. The computer-implemented system of claim 1, wherein each of the first software interface and the second software interface is configured to obtain the payment information by recognizing a payment method.

6. The computer-implemented system of claim 5, wherein the payment method is a credit card.

7. The computer-implemented system of claim 1, wherein each of the first software interface and the second software interface is configured to obtain the payment information by recognizing a payor.

8. The computer-implemented system of claim 7, wherein the payor is recognized by facial recognition.

9. The computer-implemented system of claim 1, wherein the first software interface and the second software interface comprise identical interfaces presented on different displays.

10. A computer-implemented method for submitting payments by a multi-display device, the multi-display device includes a first display configured to receive a first payment information from a first software interface, a second display configured to receive a second payment information from a second software interface, and a payment device configured to process payments, the method comprises:

establishing and maintaining a payment processing queue storing payment information in chronological order;

receiving a first payment information from the first software interface of the first display associated with a first timestamp;

in response to receiving the first payment information, disabling writing access to the payment processing queue from the second software interface presented on the second display by:

enabling an input mode in which both the first display and the second display have text input fields configured to receive input from a physical keyboard or a virtual keyboard;

denying a request from the second software interface to make changes to the payment processing queue; and requesting a resend of the denied request after a predetermined time;

adding the first payment information to the payment processing queue;

re-enabling the writing access to the payment processing queue from the second software interface presented on the second display;

reading, from the payment processing queue, a current payment information with an earliest timestamp; and submitting the current payment information for payment processing via the payment device.

11. The computer-implemented method of claim 10, further comprising:

receiving a second payment information from the second software interface of the second display associated with a second timestamp;

in response to receiving the second payment information, disabling writing access to the payment processing queue from the first software interface presented on the first display;

adding the second payment information to the payment processing queue; and re-enable the writing access to the payment processing queue from the first software interface presented on the first display.

12. The computer-implemented method of claim 10, further comprising removing the current payment information from the payment processing queue.

13. The computer-implemented method of claim 10, wherein the first and the second software interface each is configured to present one or more input fields, the one or more input fields being configured to accept non-keyboard inputs.

14. The computer-implemented method of claim 10, wherein each of the first software interface and the second software interface is configured to obtain the payment information by recognizing a payment method.

15. The computer-implemented method of claim 14, wherein the payment method is a credit card.

16. The computer-implemented method of claim 10, wherein each of the first software interface and the second software interface is configured to obtain the payment information by recognizing a payor.

17. The computer-implemented method of claim 16, wherein the payor is recognized by facial recognition.

18. A computer-implemented system for submitting payments by a multi-display device, the system comprising:

one or more memory devices storing instructions;

a first display configured to receive a first payment information from a first software interface;

a second display configured to receive a second payment information from a second software interface;

a payment device configured to process payments; and one or more processors, communicatively coupled to the first display and the second display, configured to execute the instructions to perform operations comprising:

establishing and maintaining a payment processing queue storing payment information in chronological order;

receiving a first payment information from the first software interface associated with a first timestamp;

in response to receiving the first payment information, disabling writing access to the payment processing queue from the second software interface presented on the second display by:

enabling an input mode in which both the first display and the second display have text input fields configured to receive input from a physical keyboard or a virtual keyboard;

denying a request to make changes to the payment processing queue; and requesting a resend of the denied request after a predetermined time;

adding the first payment information to the payment processing queue;

re-enabling the writing access to the payment processing queue from the second software interface presented on the second display;

receiving a second payment information from the second software interface associated with a second timestamp;

in response to receiving the second payment information, disabling writing access to the payment processing queue from the first software interface presented on the first display by:

denying a request to make changes to the payment processing queue; and requesting a resend of the denied request after a predetermined time;

adding the second payment information to the payment processing queue; and re-enable the writing access to the payment processing queue from the first software interface presented on the first display;

reading, from the payment processing queue, a current payment information with an earliest timestamp; and submitting the current payment information for payment processing via the payment device; and removing the current payment information from the payment processing queue.

\* \* \* \* \*